(12) United States Patent
Yoshida et al.

(10) Patent No.: US 11,494,601 B2
(45) Date of Patent: Nov. 8, 2022

(54) PRINTER AND POWER CONTROL PROGRAM

(71) Applicant: Seiko Instruments Inc., Chiba (JP)

(72) Inventors: Koki Yoshida, Chiba (JP); Yoshio Kitamura, Chiba (JP); Yohei Ishidoya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 17/214,480

(22) Filed: Mar. 26, 2021

(65) Prior Publication Data

US 2021/0303953 A1    Sep. 30, 2021

(30) Foreign Application Priority Data

Mar. 31, 2020   (JP) .............................. JP2020-062301

(51) Int. Cl.
  *G06K 15/00*   (2006.01)
  *G06K 15/02*   (2006.01)
(52) U.S. Cl.
  CPC ....... *G06K 15/4055* (2013.01); *G06K 15/028* (2013.01)
(58) Field of Classification Search
  CPC ................................................. G06K 15/4055
  USPC ....................................................... 358/1.13
  See application file for complete search history.

(56) References Cited

U.S. PATENT DOCUMENTS

| | | | |
|---|---|---|---|
| 6,072,585 A | 6/2000 | Dutton et al. | |
| 10,406,823 B2 | 9/2019 | Ozawa | |
| 2005/0050371 A1 | 3/2005 | Ono | |
| 2009/0222680 A1* | 9/2009 | Hirai | G06F 1/3203 |
| | | | 713/310 |
| 2015/0264208 A1* | 9/2015 | Achiwa | H04N 1/00885 |
| | | | 358/1.15 |
| 2018/0284865 A1* | 10/2018 | Shimamura | H04N 1/00904 |
| 2021/0306500 A1* | 9/2021 | Ota | G06F 3/1229 |

FOREIGN PATENT DOCUMENTS

JP    2016-064521 A    4/2016

OTHER PUBLICATIONS

Extended European Search Report in Europe Application No. 21165795.2, dated Jul. 22, 2021, 8 pages.

\* cited by examiner

*Primary Examiner* — Jacky X Zheng
(74) *Attorney, Agent, or Firm* — Crowell & Moring LLP

(57) ABSTRACT

A printer includes: a first connector to be used to input electric power supplied from an outside; a second connector to which a communication terminal is to be connected, and which is to be used to output at least a part of the electric power to the connected communication terminal; a printing control unit configured to control operation of a printing unit configured to perform printing on recording paper; and an adjustment unit configured to adjust a maximum amount of the electric power to be output from the second connector, of the electric power supplied from the outside, to a first amount of power when the printing unit is not under a printing operation, and adjust the maximum amount of the electric power to be output from the second connector to a second amount of power when the printing unit is under the printing operation, the second amount of power being smaller than the first amount of power.

5 Claims, 4 Drawing Sheets

PRINTER AND POWER CONTROL PROGRAM

RELATED APPLICATIONS

This application claims priority to Japanese Patent Application No. 2020-062301, filed on Mar. 31, 2020, the entire content of which is incorporated herein by reference.

BACKGROUND OF THE INVENTION

1. Field of the Invention

The present invention relates to a printer and a power control program.

2. Description of the Related Art

Hitherto, there has been known a technology of supplying, to a USB device connected to a USB port of a printer, electric power supplied from an AC power supply adapter to the printer.

However, with the printer of the related art, an amount of power supply to the USB device may become short depending on an operation status of the printer.

In view of the above, in this technical field, there have been demands for printer and a power control program with which an amount of power supply to a connected terminal can be adjusted depending on an operation status.

SUMMARY OF THE INVENTION

According to one embodiment of the present invention, there is provided a printer, including: a first connector to be used to input electric power supplied from an outside; a second connector to which a communication terminal is to be connected, and which is to be used to output at least a part of the electric power to the connected communication terminal; a printing control unit configured to control operation of a printing unit configured to perform printing on recording paper; and an adjustment unit configured to adjust a maximum amount of the electric power to be output from the second connector, of the electric power supplied from the outside, to a first amount of power when the printing unit is not under a printing operation, and adjust the maximum amount of the electric power to be output from the second connector to a second amount of power when the printing unit is under the printing operation, the second amount of power being smaller than the first amount of power.

In the above-mentioned printer according to the one embodiment of the present invention, wherein In the above-mentioned printer according to the one embodiment of the present invention, wherein the second connector complies with a USB Power Delivery specification.

In the above-mentioned printer according to the one embodiment of the present invention, wherein the printer is a thermal printer, and wherein the second amount of power is an excess amount of power obtained by excluding, from an amount of power suppliable from the outside, an amount of power used for the printing operation of the printing unit.

In the above-mentioned printer according to the one embodiment of the present invention, wherein the adjustment unit is configured to maintain the maximum amount of the electric power to be output from the second connector at the second amount of power when a certain time period has not elapsed since completion of the printing operation of the printing unit, and switch the maximum amount of the electric power to be output from the second connector from the second amount of power to the first amount of power when the certain time period has elapsed from the completion of the printing operation of the printing unit.

According to one embodiment of the present invention, there is provided a power control program, including: a printing control step of controlling operation of a printing unit configured to perform printing on recording paper; and an adjustment step of adjusting a maximum amount of electric power to be output from a second connector, of the electric power supplied through a first connector used to input the electric power supplied from an outside, to a first amount of power when the printing unit is not under a printing operation, and adjusting the maximum amount of the electric power to be output from the second connector to a second amount of power when the printing unit is under the printing operation, the second connector having a communication terminal connected thereto, and being used to output at least a part of the electric power to the connected communication terminal, the second amount of power being smaller than the first amount of power.

DETAILED DESCRIPTION OF THE PREFERRED EMBODIMENTS

Figure 1:
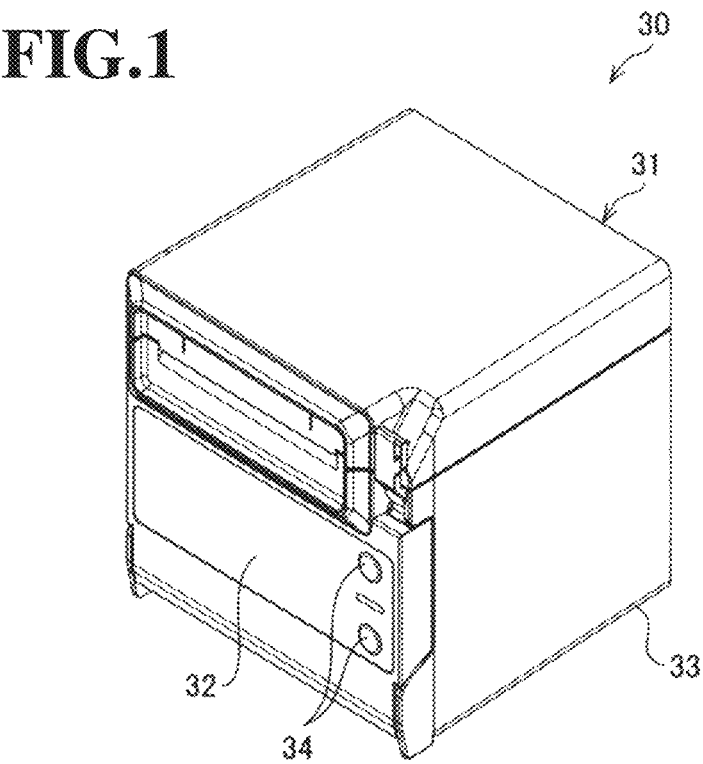
FIG. 1 is a front perspective view of a printer according to at least one embodiment of the present invention.

FIG. 1 is a front perspective view of a printer 30 according to at least one embodiment of the present invention. As illustrated in FIG. 1, the printer 30 includes a housing 31 formed into a cube, and a printer cover 32 rotatably connected to the housing 31. The housing 31 is made of a composite resin material or a metal material, for example, and includes a plurality of outside surfaces including a bottom surface 33 opposed to an installation surface (not shown) on which the printer 30 is installed.

The printer 30 is a thermal printer configured to perform printing on heat-sensitive paper serving as roll-type recording paper with heat. The heat-sensitive paper is housed inside the housing 31.

On the printer cover 32, two operation buttons 34 are arranged in a state of being exposed to be depressible on an outside surface of the printer cover 32. Examples of the operation buttons 34 include a power button and a feed button.

One of the operation buttons 34 serving as the power button is configured to switch between power on and off of the printer 30 based on a depression operation.

The other of the operation buttons 34 serving as the feed button is configured to perform feed processing of conveying the heat-sensitive paper by a predetermined pitch based on a depression operation. Further, when the depression operation is performed on both of the operation buttons 34 at the same time, the printer 30 performs test print processing of printing a predetermined test pattern on the heat-sensitive paper.

Figure 2:
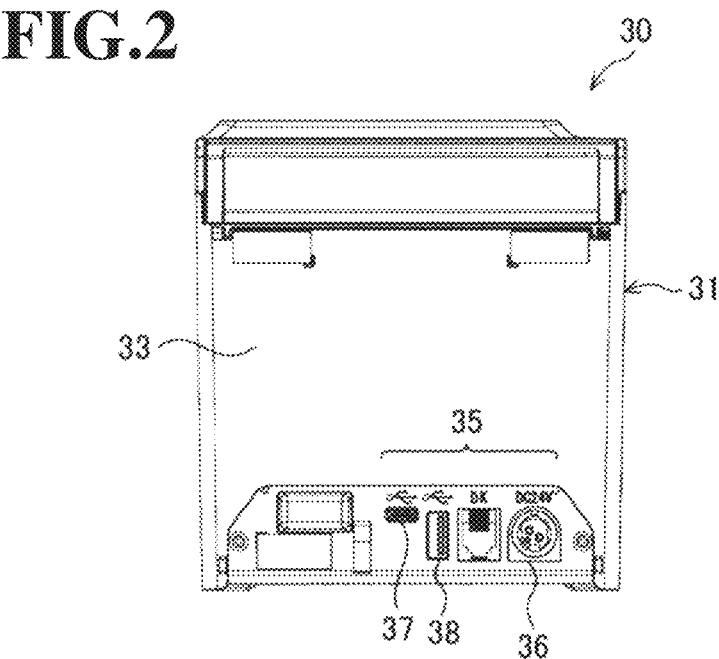
FIG. 2 is a bottom view of the printer according to the at least one embodiment.

FIG. 2 is a bottom view of the printer 30 according to the at least one embodiment. As illustrated in FIG. 2, various connection connectors 35 used to connect peripheral devices to the printer 30 are provided on the bottom surface 33 of the housing 31. The connection connectors 35 at least include a power supply connector 36 used to input DC power supplied from a power supply adaptor 20 (see FIG. 3), which is to be described later and serves as an outside, to the printer 30, a Universal Serial Bus (USB) connector 37 used to output a part of the DC power supplied from the power supply adaptor 20 and data to a communication terminal 50 to be described later, and an interface (I/F) connector 38 used to connect a display device (not shown), for example. This USB connector 37 complies with the USB Power Delivery specification, and a USB cable 40 (see FIG. 3) of the USB Type-C specification can be connected thereto. The power supply connector 36 is an example of "first connector," and the USB connector 37 is an example of "second connector."

Figure 3:
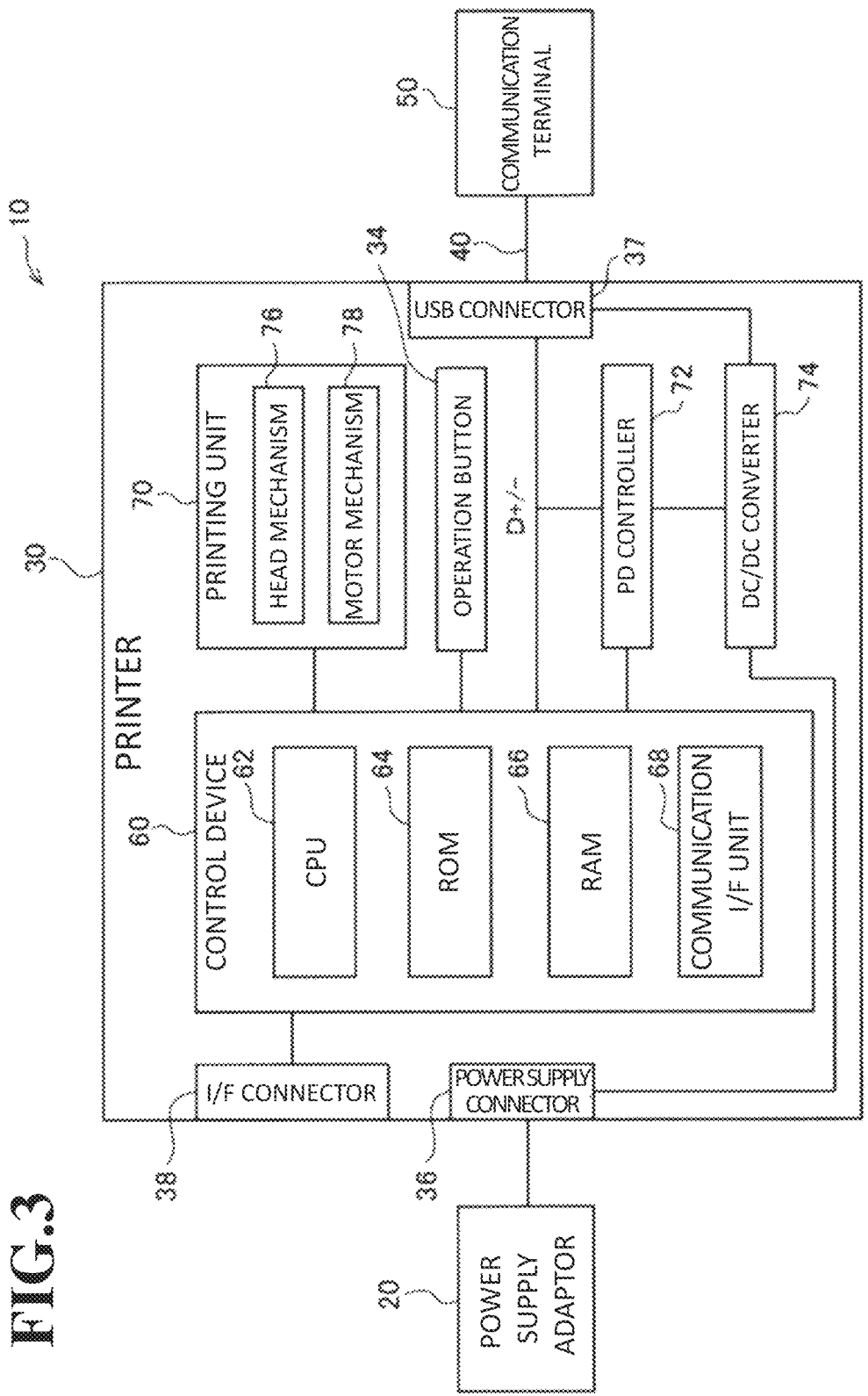
FIG. 3 is a system configuration diagram of a power control system in the at least one embodiment.

Next, referring to FIG. 3, a power control system 10 in the at least one embodiment is described. This power control system 10 has a function of the printer 30 supplying a part of the DC power supplied from the power supply adaptor 20 to the communication terminal 50 connected to the printer 30 through the USB cable 40.

The power supply adaptor 20 is configured to rectify an input of AC 100 V which is input via a power supply (not shown) to supply the DC power to the printer 30.

The communication terminal 50 is a terminal device which is connected to the printer 30 through the USB cable 40 and can communicate to/from the printer 30. This communication terminal 50 includes a connection connector (not shown) to which the USB cable 40 of the USB Type-C specification can be connected. In the at least one embodiment, a Mobile Point of Sales (mPOS) terminal formed of a smartphone or a tablet terminal, for example, is used as an example of the communication terminal 50.

Next, a hardware configuration of the printer 30 is described. As illustrated in FIG. 3, the printer 30 includes a control device 60 configured to control operation of the printer 30, a printing unit 70, a Power Delivery (PD) controller 72, a DC/DC converter 74, the operation buttons 34, the power supply connector 36, the USB connector 37, and the I/F connector 38. The control device 60 and each of the above-mentioned components are connected to each other through an input/output interface (not shown).

In the control device 60, a central processing unit (CPU) 62, a read only memory (ROM) 64, a random access memory (RAM) 66, and a communication I/F unit 68 are connected to be communicable to/from one another.

The CPU 62 is a central processing unit, and is configured to execute various programs and control the respective units. In other words, the CPU 62 is configured to read the programs from the ROM 64, and execute the programs with the RAM 66 serving as a work area. The CPU 62 is configured to perform control on the above-mentioned components and various kinds of arithmetic processing in accordance with the programs stored in the ROM 64.

The ROM 64 is configured to store the various programs and various data. The various programs at least include a power control program for causing a computer to execute power control processing to be described later.

The RAM 66 is configured to temporally store the programs and data as the work area. The communication I/F unit 68 is configured to perform wired communication or wireless communication to/from the communication terminal 50 and the peripheral devices connected via the I/F connector 38, for example.

The printing unit 70 includes a head mechanism 76 configured to perform printing on the heat-sensitive paper, and a motor mechanism 78 configured to drive and rotate a roller (not shown) to convey the heat-sensitive paper by the predetermined pitch.

The PD controller 72 is a controller integrated circuit (IC) that complies with the USB Type-C specification and the USB Power Delivery specification. This PD controller 72 is configured to receive data from the communication terminal 50 connected to the printer 30 through the USB cable 40, and transmit data to the communication terminal 50.

The DC/DC converter 74 is configured to change the DC power supplied from the power supply adaptor 20 to the printer 30 into a predetermined voltage. For example, the DC/DC converter 74 is configured to step down a 24-V voltage from the power supply adaptor 20 to a range of from 5 V to 20 V.

Figure 4:
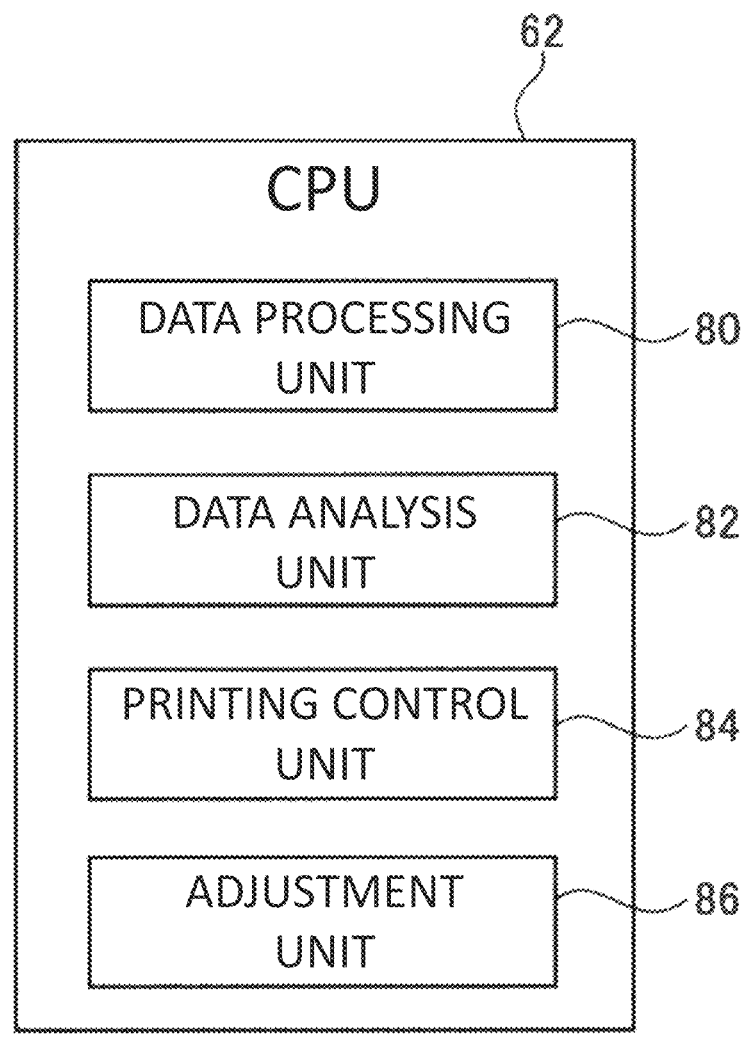
FIG. 4 is a block diagram for illustrating a functional configuration of a CPU in the at least one embodiment.

Next, referring to FIG. 4, functions of the CPU 62 are described. As illustrated in FIG. 4, the CPU 62 is configured to execute the programs stored in the ROM 64 to function as a data processing unit 80, a data analysis unit 82, a printing control unit 84, and an adjustment unit 86.

The data processing unit 80 is configured to process input data. For example, when print data containing a content to be printed on the heat-sensitive paper is input from the communication terminal 50 or the I/F connector 38, the data processing unit 80 instructs the printing control unit 84 to perform print processing corresponding to the print data. Further, when the depression operation is performed on the feed button, for example, as one of the operation buttons 34, so that feed data for conveying the heat-sensitive paper by the predetermined pitch is input, the data processing unit 80 instructs the printing control unit 84 to perform feed processing corresponding to the feed data.

The data analysis unit 82 is configured to analyze whether processing performed by the data processing unit 80 is processing accompanying printing on the heat-sensitive paper, specifically, the print processing or the test print processing, or other processing.

The printing control unit 84 is configured to control operation of the printing unit 70. Specifically, when the print processing or the test print processing is to be performed, the printing control unit 84 controls a printing operation of performing printing on the heat-sensitive paper by the printing unit 70. When controlling the printing operation, the printing control unit 84 drives the head mechanism 76 and the motor mechanism 78 of the printing unit 70. In contrast, when performing processing other than the print processing or the test print processing, for example, the feed processing, the printing control unit 84 drives only the motor mechanism 78 of the printing unit 70.

The adjustment unit 86 is configured to adjust a maximum amount of the DC power to be output from the USB connector 37. This adjustment unit 86 is configured to adjust the maximum amount of the DC power to be output from the USB connector 37, of the DC power supplied from the power supply adaptor 20, to a first amount of power when the printing unit 70 is not under the printing operation, and adjust the maximum amount of the DC power to be output from the USB connector 37 to a second amount of power when the printing unit 70 is under the printing operation, the second amount of power being smaller than the first amount of power.

The first amount of power is an excess amount of power obtained by excluding, from an amount of power supplied from the power supply adaptor 20 to the printer 30, an amount of power used by the printer 30 when the printing unit 70 is not under the printing operation. In the at least one embodiment, the first amount of power is set, as an example, to "100 W" which is a maximum amount of power that can be supplied from the printer 30 to the communication terminal 50 based on the USB Power Delivery specification.

The second amount of power is an excess amount of power obtained by excluding, from the amount of power supplied from the power supply adaptor 20 to the printer 30, an amount of power used by the printer 30 when the printing unit 70 is under the printing operation. In the at least one embodiment, "the amount of power used by the printer 30 when the printing unit 70 is under the printing operation" is not variable for each printing operation, but is a predetermined constant value. As a result, in the at least one embodiment, the second amount of power is not variable for each printing operation, and is set to "10 W" across the board as an example.

Figure 5:
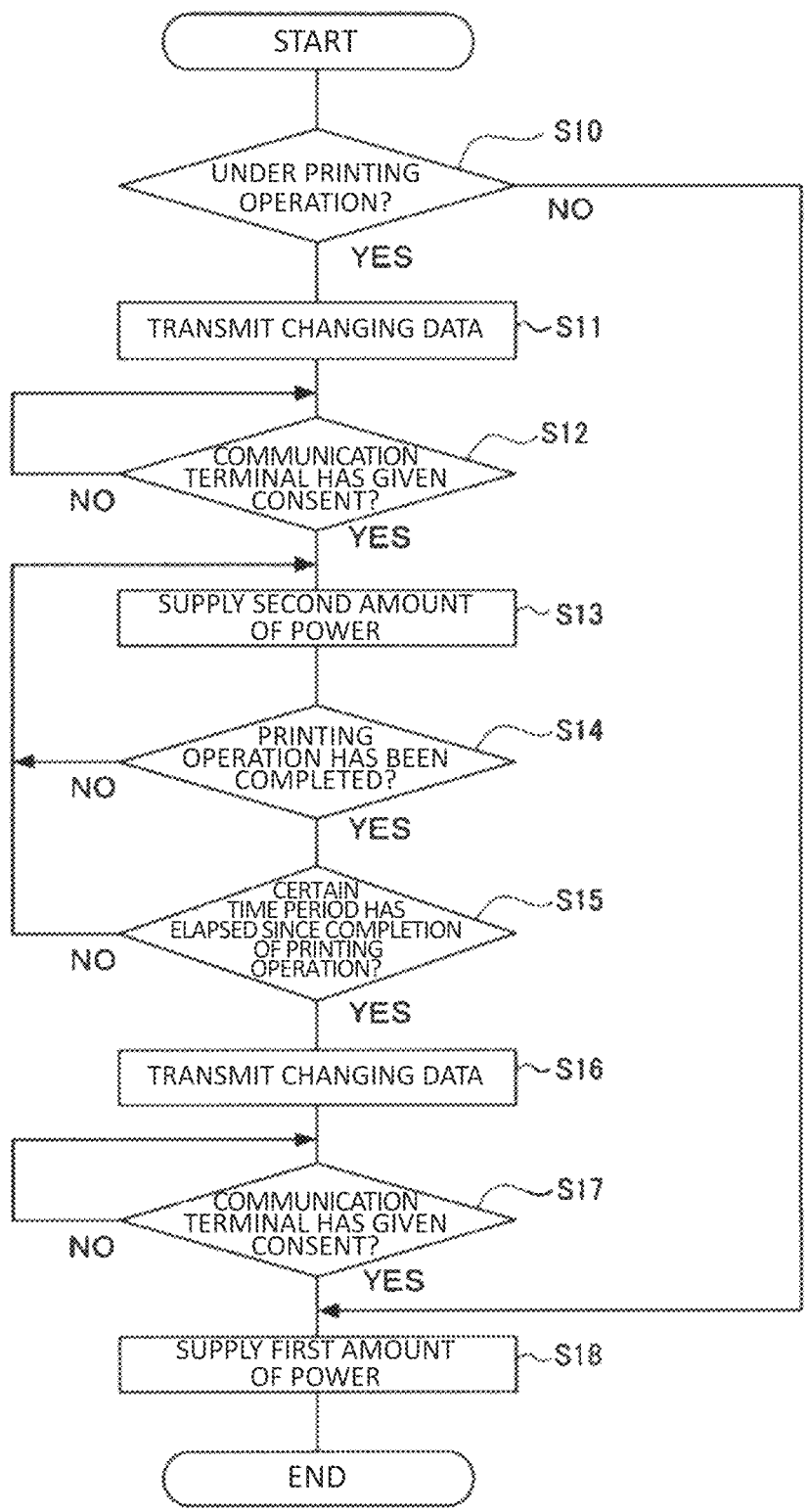
FIG. 5 is a flow chart for illustrating a flow of power control processing in the at least one embodiment.

FIG. 5 is a flow chart for illustrating a flow of the power control processing. In the at least one embodiment, when the printer 30 and the communication terminal 50 are connected to each other through the USB cable 40, data for requiring an amount of power to be supplied is transmitted from the communication terminal 50 to the printer 30. Then, when the amount of power desired by the communication terminal 50 to be supplied is within the first amount of power, the printer 30 supplies the desired amount of power desired by the communication terminal 50 is supplied from the printer 30 to the communication terminal 50.

In Step S10 illustrated in FIG. 5, the CPU 62 determines whether the printing unit 70 is under the printing operation. Specifically, the CPU 62 determines whether the print processing is being performed based on input of the print data from the communication terminal 50, and whether the test print processing is being performed based on the depression operation performed on both of the operation buttons 34 at the same time. Then, when the CPU 62 determines that the printing unit 70 is under the printing operation, the processing proceeds to Step S11, and when the CPU 62 does not determine that the printing unit 70 is under the printing operation, the processing proceeds to Step S18.

In Step S11, changing data for requiring consent to change the maximum amount of the DC power to be supplied is transmitted to the communication terminal 50. Specifically, in Step S11, under control of the CPU 62, the PD controller 72 transmits, to the communication terminal 50, the changing data for requiring consent to change the maximum amount of the DC power to be output from the USB connector 37 from the first amount of power to the second amount of power. Then, the processing proceeds to Step S12.

In Step S12, it is determined whether the communication terminal 50 has given consent. Then, when the PD controller 72 receives response data of "with consent" from the communication terminal 50, the CPU 62 determines that the communication terminal 50 has given consent, and the processing proceeds to Step S13. In contrast, when the PD controller 72 receives response data of "without consent" from the communication terminal 50, the CPU 62 does not determine that the communication terminal 50 has given consent, and the processing repeats Step S12.

In Step S13, the CPU 62 adjusts the maximum amount of the DC power to be output from the USB connector 37 to the second amount of power. For example, in Step S13, under control of the CPU 62, the PD controller 72 adjusts a current value of the DC power output from the DC/DC converter 74 so that the maximum amount of the DC power to be output from the USB connector 37 becomes the second amount of power. Then, the processing proceeds to Step S14.

In Step S14, the CPU 62 determines whether the printing operation of the printing unit 70 has been completed. Specifically, the CPU 62 determines whether a print job corresponding to the print processing or the test print processing that is being performed has been completed. When the CPU 62 determines that the printing operation of the printing unit 70 has been completed, the processing proceeds to Step S15. In contrast, when the CPU 62 does not determine that the printing operation of the printing unit 70 has been completed, the processing proceeds to Step S13.

In Step S15, the CPU 62 determines whether a certain time period has elapsed since the completion of the printing operation of the printing unit 70. Specifically, the CPU 62 determines whether the certain time period has elapsed since the completion of the most recently performed print job. When the CPU 62 determines that the certain time period has elapsed since the completion of the printing operation of the printing unit 70, the processing proceeds to Step S16. In contrast, when the CPU 62 does not determine that the certain time period has elapsed since the completion of the printing operation of the printing unit 70, the processing proceeds to Step S13.

In Step S16, changing data for requiring consent to change the maximum amount of the DC power to be supplied is transmitted to the communication terminal 50. Specifically, in Step S16, under control of the CPU 62, the PD controller 72 transmits, to the communication terminal 50, the changing data for requiring consent to change the maximum amount of the DC power to be output from the USB connector 37 from the second amount of power to the first amount of power. Then, the processing proceeds to Step S17.

In Step S17, it is determined whether the communication terminal 50 has given consent. When the PD controller 72 receives the response data of "with consent" from the communication terminal 50, the CPU 62 determines that the communication terminal 50 has given consent, and the processing proceeds to Step S18. In contrast, when the PD controller 72 receives the response data of "without consent" from the communication terminal 50, the CPU 62 does not determine that the communication terminal 50 has given consent, and the processing repeats Step S17.

In Step S18, the CPU 62 adjusts the maximum amount of the DC power to be output from the USB connector 37 to the first amount of power. For example, in Step S18, under control of the CPU 62, the PD controller 72 adjusts the current value of the DC power to be output from the DC/DC converter 74 so that the maximum amount of the DC power to be output from the USB connector 37 becomes the first amount of power. Then, the processing ends.

The printer 30 according to the at least one embodiment includes the power supply connector 36 used to input the DC power supplied from the power supply adaptor 20, and the USB connector 37 used to output, to the communication terminal 50, at least a part of the DC power supplied from the power supply adaptor 20. The printer 30 further includes the printing control unit 84 configured to control operation of the printing unit 70, and the adjustment unit 86 configured to adjust the maximum amount of the DC power to be output from the USB connector 37, of the DC power supplied from the power supply adaptor 20, to the first amount of power when the printing unit 70 is not under the printing operation, and adjust the maximum amount of the DC power to be output from the USB connector 37 to the second amount of power when the printing unit 70 is under the printing operation, the second amount of power being smaller than the first amount of power. Therefore, according to the at least one embodiment, an amount of power supply to the communication terminal 50 can be adjusted depending on an operation status of the printer 30.

The USB connector 37 in the at least one embodiment complies with the USB Power Delivery specification. As a result, the maximum amount of the DC power to be output from the USB connector 37 is "100 W" as an example. Therefore, according to the at least one embodiment, as compared to a configuration including a connector that can output only a 2.5-W (5 V*0.5 A) DC power in accordance with a related-art USB specification (for example, USB 2.0) that does not comply with the USB Power Delivery specification, larger DC power can be supplied to the communication terminal 50 connected to the printer 30.

The printer 30 according to the at least one embodiment is a thermal printer configured to perform printing on the heat-sensitive paper with heat. Further, the thermal printer uses a larger amount of power for the printing operation than an inkjet printer configured to perform printing by directly applying ink to the recording paper. Therefore, when a set value of the amount of power supply to the communication terminal 50 exceeds the amount of power used by the printer 30 when the printing unit 70 is under the printing operation, the amount of power of the set value cannot be supplied during the printing operation, and there is a fear that power supply to the communication terminal 50 may be stopped.

In view of the above-mentioned problem, in the at least one embodiment, the maximum amount of the DC power to be output from the USB connector 37 is set to the second amount of power when the printing unit 70 is under the printing operation, and the second amount of power is set to the excess amount of power obtained by excluding, from the amount of power that can be supplied from the power supply adaptor 20, the amount of power used for the printing operation. Therefore, according to the at least one embodiment, the power supply to the communication terminal 50 can be prevented from being stopped during the printing operation of the printing unit 70.

The adjustment unit 86 in the at least one embodiment maintains the maximum amount of the DC power to be output from the USB connector 37 at the second amount of power when the certain time period has not elapsed since the completion of the printing operation of the printing unit 70. In other words, the adjustment unit 86 maintains the second amount of power because, when a new print job is input before the certain time period elapses from the completion of the printing operation of the printing unit 70, the printing operation of the printing unit 70 is performed again.

In contrast, the adjustment unit 86 switches the maximum amount of the DC power to be output from the USB connector 37 from the second amount of power to the first amount of power when the certain time period has elapsed since the completion of the printing operation of the printing unit 70. With the above-mentioned configuration, according to the at least one embodiment, an appropriate amount of power can be supplied to the communication terminal 50 depending on the operation status of the printer 30.

In the above-mentioned at least one embodiment, the power supply connector 36 is a connector used to input the DC power supplied from the power supply adaptor 20. However, the present invention is not limited thereto, and the power supply connector 36 may be a connector used to input DC power supplied from an electronic device that complies with the USB Power Delivery specification. In other words, the power supply connector 36 may comply with the USB Power Delivery specification so that a USB cable of the USB Type-C specification can be connected thereto.

In the above-mentioned at least one embodiment, the adjustment unit 86 can adjust the maximum amount of the DC power to be output from the USB connector 37 to the two types: the first amount of power and the second amount of power. However, the present invention is not limited thereto, and the adjustment unit 86 can adjust the maximum amount to three or more types. For example, the adjustment unit 86 may adjust the maximum amount of the DC power to be output from the USB connector 37 to a third amount of power when the feed processing is being performed, the third amount of power being smaller than the first amount of power and larger than the second amount of power.

In the above-mentioned at least one embodiment, the second amount of power is not variable for each printing operation, and is set to the amount of power across the board. However, the present invention is not limited thereto, and the second amount of power may be variable depending on the printing operation. For example, When a printing operation using an amount of power exceeding a predetermined value is being performed, the second amount of power is set to be lower than a reference value. In contrast, when a printing operation using an amount of power that is equal to or less than the predetermined value is being performed, the second amount of power may be set to be higher than the reference value.

What is claimed is:

1. A thermal printer, comprising:
   a first connector to be used to input electric power supplied from an outside;
   a second connector to which a communication terminal is to be connected, and which is to be used to output at least a part of the electric power to the connected communication terminal; and
   at least one processor configured to:
   control operation of a thermal printing unit configured to perform thermal printing on heat-sensitive recording paper; and
   adjust a maximum amount of the electric power to be output from the second connector, of the electric power supplied from the outside, to a first amount of power when the thermal printing unit is not under a printing operation, and adjust the maximum amount of the electric power to be output from the second connector to a second amount of power when the thermal printing unit is under the printing operation, the second amount of power being smaller than the first amount of power,
   wherein the second amount of power is determined as an excess amount of power obtained by subtracting, from an amount of power suppliable from the outside, an amount of power used for the printing operation of the thermal printing unit.

2. The thermal printer according to claim 1, wherein the second connector complies with a USB Power Delivery specification.

3. The thermal printer according to claim 1, wherein the at least one processor is configured to maintain the maximum amount of the electric power to be output from the second connector at the second amount of power when a certain time period has not elapsed since completion of the printing operation of the thermal printing unit, and switch the maximum amount of the electric power to be output from the second connector from the second amount of power to the first amount of power when the certain time period has elapsed from the completion of the printing operation of the thermal printing unit.

4. The printer according to claim 1,
wherein the at least one processor is further configured to:
adjust the maximum amount of the electric power to be output from the second connector to a third amount of power when the thermal printing unit is under a feed operation and is not under a printing operation, the third amount of power being smaller than the first amount of power and larger than the second amount of power.

5. A non-transitory computer readable storage medium for storing a power control program executed to implement:
controlling operation of a thermal printing unit configured to perform printing on heat-sensitive recording paper; and
adjusting a maximum amount of electric power to be output from a second connector, of the electric power supplied through a first connector used to input the electric power supplied from an outside, to a first amount of power when the thermal printing unit is not under a printing operation, and adjusting the maximum amount of the electric power to be output from the second connector to a second amount of power when the thermal printing unit is under the printing operation, the second connector having a communication terminal connected thereto, and being used to output at least a part of the electric power to the connected communication terminal, the second amount of power being smaller than the first amount of power,
wherein the second amount of power is determined as an excess amount of power obtained by subtracting, from an amount of power suppliable from the outside, an amount of power used for the printing operation of the thermal printing unit.

\* \* \* \* \*